United States Patent
Moore et al.

(10) Patent No.: US 8,872,766 B2
(45) Date of Patent: Oct. 28, 2014

(54) SYSTEM AND METHOD FOR OPERATING A HELMET MOUNTED DISPLAY

(75) Inventors: Eric Kurt Moore, Indianapolis, IN (US); Andrew Bruinsma, Indianapolis, IN (US)

(73) Assignee: Raytheon Company, Waltham, MA (US)

( * ) Notice: Subject to any disclaimer, the term of this patent is extended or adjusted under 35 U.S.C. 154(b) by 452 days.

(21) Appl. No.: 13/104,470

(22) Filed: May 10, 2011

(65) Prior Publication Data

US 2012/0287040 A1 Nov. 15, 2012

(51) Int. Cl.
- G06F 3/033 (2013.01)
- G02B 27/01 (2006.01)
- G06F 3/01 (2006.01)
- G06F 3/0346 (2013.01)

(52) U.S. Cl.
CPC .............. G06F 3/0346 (2013.01); G02B 27/01 (2013.01); G06F 3/012 (2013.01); G02B 2027/0187 (2013.01); G02B 27/0189 (2013.01)
USPC .............................. 345/157; 345/8

(58) Field of Classification Search
CPC ........... G02B 2027/0187; G02B 27/01; G02B 27/0189; G06F 3/012; G06F 3/0346
USPC ................................. 345/7–8, 157
See application file for complete search history.

(56) References Cited

U.S. PATENT DOCUMENTS

| | | | |
|---|---|---|---|
| 6,462,882 B2 | 10/2002 | Chen et al. | |
| 6,847,336 B1 | 1/2005 | Lemelson et al. | |
| 7,266,446 B1 | 9/2007 | Pelosi | |
| 2001/0035845 A1* | 11/2001 | Zwern | 345/8 |
| 2004/0196433 A1* | 10/2004 | Durnell | 351/209 |
| 2005/0206583 A1* | 9/2005 | Lemelson et al. | 345/7 |
| 2005/0248852 A1* | 11/2005 | Yamasaki | 359/630 |
| 2006/0061544 A1* | 3/2006 | Min et al. | 345/156 |
| 2007/0011609 A1* | 1/2007 | Adjouadi et al. | 715/700 |
| 2009/0153468 A1* | 6/2009 | Ong et al. | 345/156 |
| 2009/0174946 A1* | 7/2009 | Raviv et al. | 359/632 |
| 2010/0091377 A1* | 4/2010 | Hedges et al. | 359/630 |
| 2010/0103075 A1* | 4/2010 | Kalaboukis et al. | 345/8 |
| 2010/0185113 A1 | 7/2010 | Peot et al. | |
| 2010/0231705 A1* | 9/2010 | Yahav et al. | 348/115 |

* cited by examiner

*Primary Examiner* — Quan-Zhen Wang
*Assistant Examiner* — Tony Davis
(74) *Attorney, Agent, or Firm* — Daly, Crowley, Mofford & Durkee, LLP

(57) ABSTRACT

A display system comprises a transparent display device mountable on the head of a user. A scene of an environment is visible to the user through the transparent display device. The system further comprises a user interface image adapted for display on the display device. The user interface image remains fixed relative to the scene as the user and the display device move within the environment. The display system also comprises an indicator image adapted for display on the display device. The indicator is movable relative to the user interface image in response to movement of the user's head.

26 Claims, 6 Drawing Sheets

SYSTEM AND METHOD FOR OPERATING A HELMET MOUNTED DISPLAY

BACKGROUND

Heads-up displays (HUD) have been developed to allow a user to view information about the user's environment or activity without looking down at an instrument panel. HUD's are used in many applications including military and civilian vehicles, gaming systems, and medical devices. Helmet mounted displays (HMD's) are a type of HUD that feature a display attached to a user's helmet that moves with the user's head. The display may, for example, be incorporated in the user's visor or be incorporated into a monocular component. In military aviation applications, HMD's employ an indicator, such as a set of crosshairs, that moves with the orientation of the pilot's head to direct weapons, sensors, or other equipment toward a target. Systems and methods for improving and expanding the functionality of HMD's are needed.

BRIEF DESCRIPTION OF THE DRAWINGS

A better understanding of the present invention will be realized from the detailed description that follows, taken in conjunction with the accompanying drawings, in which.

DETAILED DESCRIPTION

The following disclosure provides many different embodiments, or examples, for implementing different features of the invention. Specific examples of components and arrangements are described below to simplify the present disclosure. These are, of course, merely examples and are not intended to be limiting.

Figure 1:
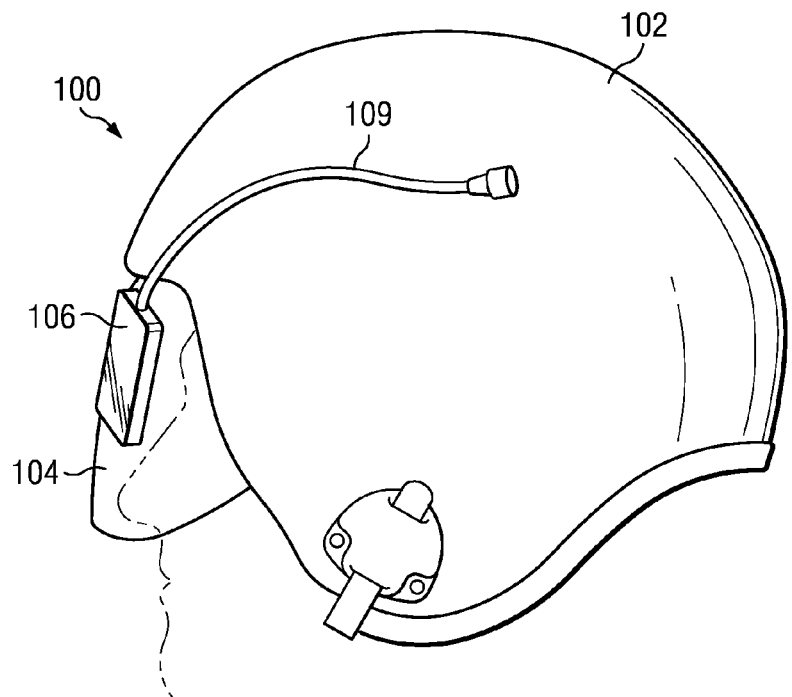
FIG. 1 is a side view of a helmet with an HMD.

FIG. 1 is a side view of a head mounted display (HMD) system 100 which includes a mounting platform 102. In this embodiment, the mounting platform 102 is a helmet which may be formed of a ballistic material of any suitable type known to afford the user protection against injury from sudden impact, flying fragments, and other threats to the user's head. In less threatening environments, the mounting platform may be a headband, a harness, or another type of attachment mechanism that attaches to the head of a user. In this embodiment, the mounting platform 102 further includes a visor 104 which extends over the user's eyes. The HMD system 100 will be generally described for use with military aircraft, however these descriptions are not intended to limit its use. In alternative embodiments, HMD systems of this disclosure may be used in different environments including other military and civilian vehicles, gaming systems, and medical devices.

Figure 2:
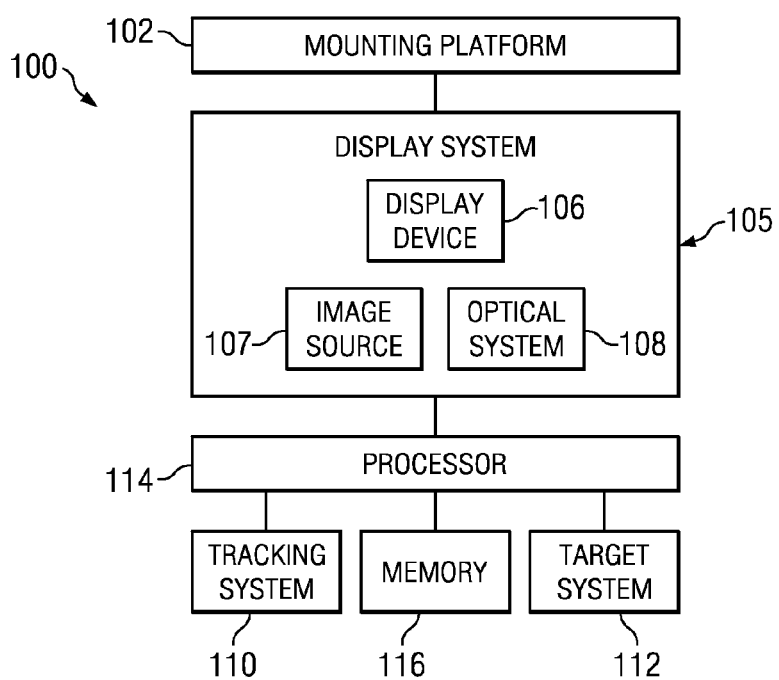
FIG. 2 is a schematic illustration of an HMD.

As shown in FIG. 1 and in the schematic illustration of FIG. 2, the system 100 includes a display system 105 which includes a display device 106, an image source 107 and an optical system 108. The display device 106 is a generally transparent device for displaying an image to the user. The image may include various combinations of information (also known as, "symbology") related to weapon targeting and/or vehicle operation. Examples of weapon targeting information include friendly and hostile target tracking, points of interest, and/or a set of crosshairs or reticle for directional indication of vehicle-mounted weapon systems. Examples of vehicle operation information include airspeed (or ground speed for a ground-based vehicle), altitude, horizon, and heading. The information may be presented in alphanumeric format or graphical format. Further, displayed information may include generated images based upon visible or non-visible (e.g. infrared or acoustic) energy.

A suitable display device may be the visor 104 itself. The Joint Helmet Mounted Cueing System (JHMCS) is one example of an HMD system that uses the visor as a display device. Another example of a display device is a light-guide optical element (LOE) as used in the Scorpion Helmet Mounted Cueing System developed by Gentex Corp. of Carbondale, Pa. Projecting an image onto a transparent body such as the visor or LOE allows the user to view a scene of the environment beyond the image while viewing the information presented by the image in a "heads-up" position. The display device 106 may be monocular or binocular. The display device 106 may be integrated into the mounting platform 102 or may be installed or attached to an existing mounting platform. It is understood that the display device 106 may project onto any suitable portion of the mounting platform 102, an attachment to the platform, or other equipment in the environment. The display device 106 may display information in a single color or in multiple colors. Display cabling 109 may be used to connect the display device 106 to other components in the HMD system 100.

The image source 107 may employ any of a variety of technologies for image generation including cathode ray tube (CRT), light emitting diode (LED), liquid crystal display (LCD), liquid crystal on silicon (LCOS), digital micro-minor (DMD), organic light emitting diode (OLED), or plasma display panel (PDP) technologies. A combination of technologies may also be employed. The optical system 108 includes lenses, mirrors, filters, prisms, and/or other optical components for delivering the image from the image source 107 to the user's eye.

The HMD system 100 further includes a tracking system 110 to track the user's helmet/head motion and position. The tracking system 100 may, for example, track information related to head azimuth, head pitch, and head tilt. The tracking system 110 includes components that may be located on the helmet and other components that may be located at various positions within the environment. A suitable tracking system may be a mechanical tracking system that utilizes, for example, inertial tracking devices that incorporate gyroscopes or other mechanical devices that rely on a physical link between a fixed reference point and the helmet. A suitable tracking system may also be an electromagnetic tracking system that measures the strength of the magnetic fields generated by sending current through wire coils. Another suitable tracking system may be an acoustic tracking system that uses ultrasonic sound waves to measure the location of the helmet. Another suitable tracking system may be an optical tracking system that uses LED's positioned on the helmet and cameras positioned within the cockpit. The above described tracking systems are not meant to be limiting, and other tracking systems known in the art may also be suitable.

Figure 3:
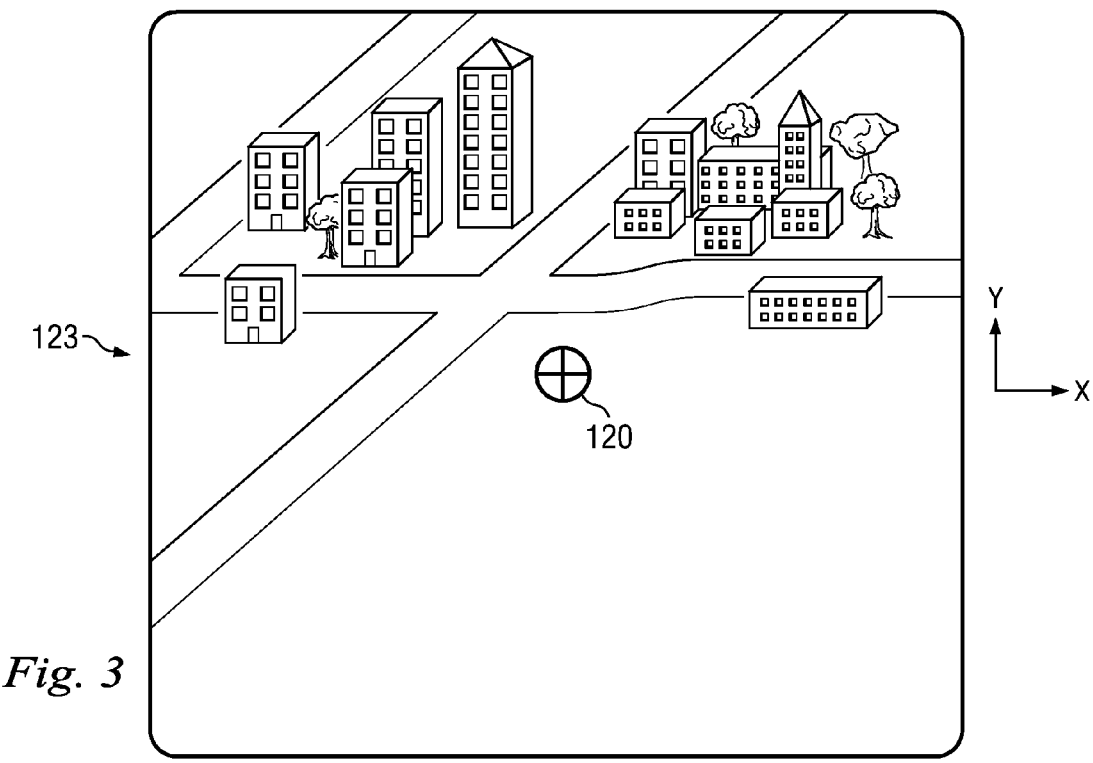
FIG. 3 is a view of a scene from an HMD.

The HMD system 100 further includes a target system 112 that operates in concert with the tracking system 110 to conduct a targeted operation. As shown in FIG. 3, the target system 112 includes an indicator 120, such as a set of crosshairs with a central pipper or a reticle, which serves as a pointing device. The indicator 120 moves relative to a scene 123 of the environment as the user's head/helmet is pointed toward a target. The target 112 system allows an action, such as a weapon firing or the activation of weapon-seeking sensors, to be directed within the environment toward the target, in the direction of the indicator 120.

The HMD system 100 further includes computer components such as a processor 114, and memory 116. These computer components process information and execute software to, for example, generate and update images for display on the display device 106. They may interface with computers or other components in the tracking system, targeting system, or other computers in the user's aircraft or environment. The computer components may be wearable by the user or may be installed elsewhere in the aircraft or environment.

Figure 4:
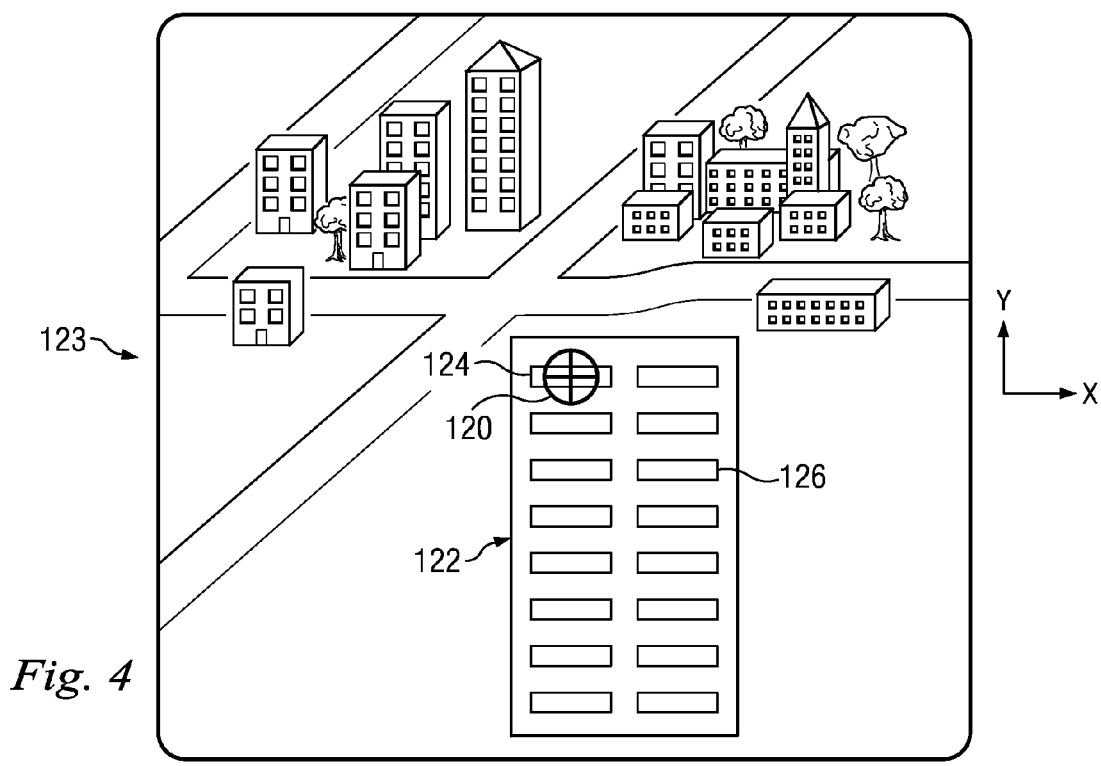
FIGS. 4 and 5 are views of the scene of FIG. 3 from the HMD with a user interface image displayed on the HMD.
Figure 5:
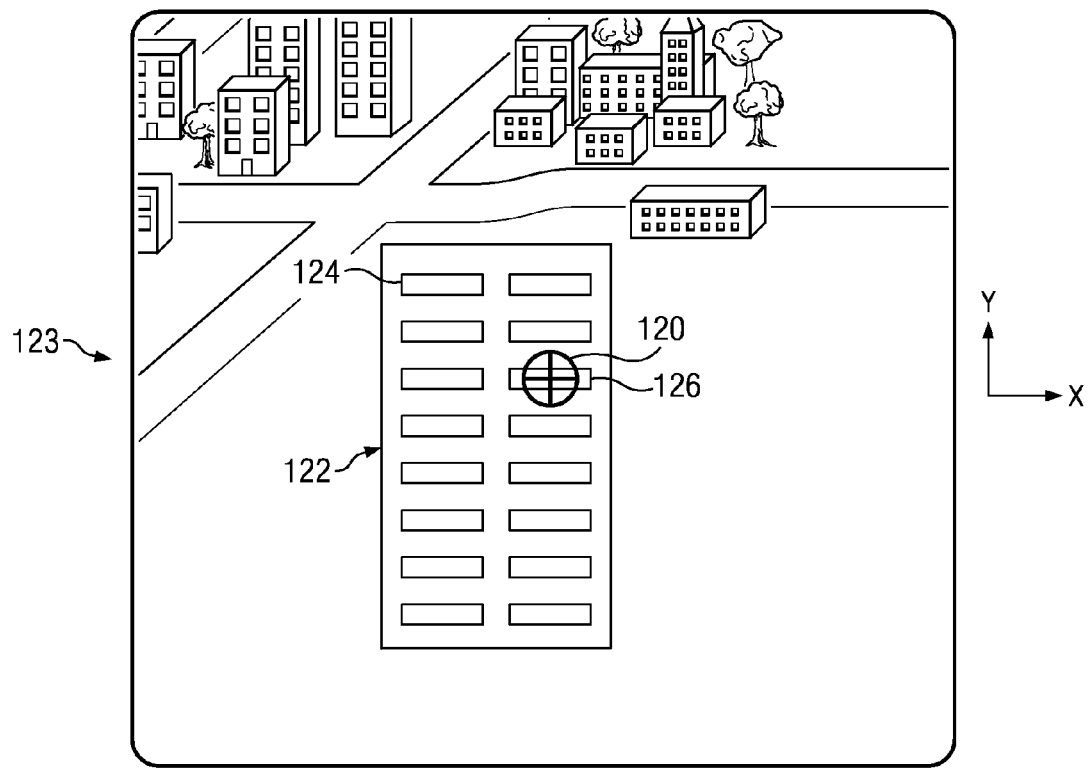

Although the HMD system 100 can be used to direct weapon firing, it may also be configured for other actions that use point and select operations to initiate or control an activity. Such actions may include display control operations, display calibration operations, or other operations that use menu or icon driven selection functions. In one embodiment, as shown in FIG. 4, a user interface image 122 is projected onto the view of the scene 123 of the environment. In this embodiment, the user interface image 122 is a menu for controlling the setup of the HMD system 100. The user interface image 122 appears stationary or fixed relative to the scene 123 as movement of the user's head causes movement of the crosshairs 120 relative to the scene and the image. For example, in FIG. 4, the crosshairs are trained on a menu item 124. To retrain the crosshairs on menu item 126, the angle of the head of the user is moved downward (Y direction) and toward the user's right (X direction). As shown in FIG. 5, this reorientation of the user's head has the effect of moving the crosshairs 120 to the menu item 126. As shown in FIG. 5, the menu 122 remained fixed relative to the scene 123 as the crosshairs 120 move relative to the scene and the stationary menu.

Figure 6:
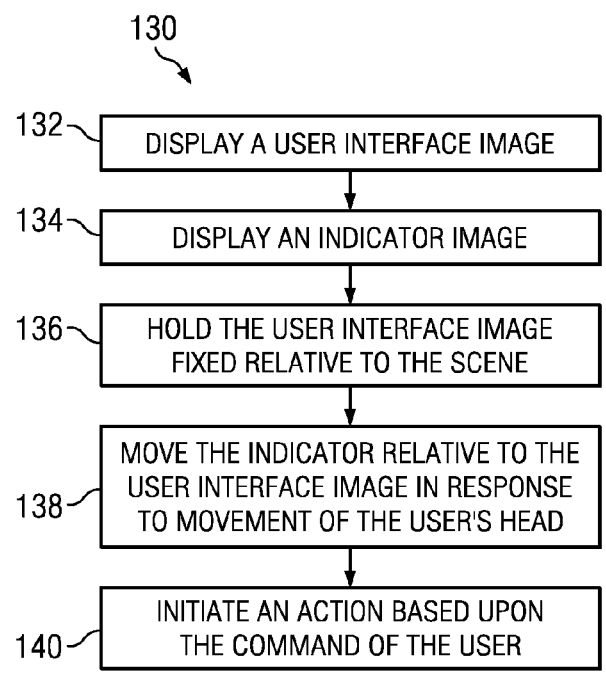
FIG. 6 is flowchart describing a method for using an HMD.

FIG. 6 provides a flowchart that describes a method for using the HMD system 100. At step 132, the user interface image 122 is shown, as in FIG. 4, superimposed upon a scene 123 of the environment. The image 122 may be a menu with menu items indicated by text, icons, or other graphical representations. At step 134, the indicator 120 is displayed in movable relationship to the scene 123 and the menu 122. The indicator may be a crosshairs, a cursor, a selection box, or any other graphic understood to represent a pointing and selecting device. At step 136, the user interface image 122 is held fixed relative to objects or landmarks in the scene 123 (e.g., "aircraft fixed" when used by a pilot) as the orientation of the user's head is changed. In other words, the user interface image 122 appears fixed in space in the same reference frame as the vehicle (or other environmental feature) in which the user is travelling or otherwise acting. When the user's head is moved, the menu appears fixed by remaining in the same position relative to objects in the scene of the environment viewed by the user.

At step 138, (as shown in FIGS. 4 and 5) as the user's gaze or head direction moves from menu item 124 to menu item 126, the crosshairs 120 move relative to the scene 123 and the menu 122 from a position trained on menu item 124 to a position trained on menu item 126. At step 140, an action is initiated based upon a selection command entered by the user. For example, with the crosshairs 120 trained on the menu item 126, the user may depress a selection control button 144 on a control column 142 (FIG. 7) in the user's vehicle to initiate the function associated with menu item 126. Alternatively, the function associated with menu item 126 may be initiated by other acts of the user including the utterance of an oral command, a movement of the user's body, a stroke of a key, or other known selection acts.

Figure 7:
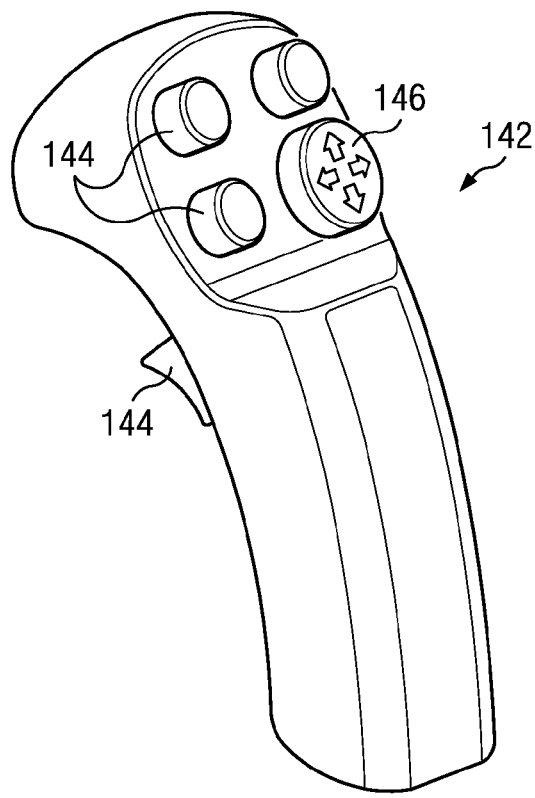
FIG. 7 is a perspective view of a vehicle control column.

As shown in FIG. 7, a control column 142 located in the user vehicle (not shown) includes multiple selection controls 144. The control column also includes arrow keys 146. In an alternative embodiment, the indicator may be moved relative to the menu with the arrow keys, rather than the based on the orientation of the user's head. The control column 142 may be a hands-on throttle and stick (HOTAS).

The menu items of image 122 may correspond to various helmet control functions. The displayed menu items may be grouped in menus and submenus based upon likely priority to the user.

Priority 1 control functions are functions that are immediately needed and may include: TURN POWER ON, TURN POWER OFF, INCREASE BRIGHTNESS, DECREASE BRIGHTNESS, and COURSE CORESIGHT.

Priority 2 control functions are functions that may be needed quickly and may include: HOVER SYMBOLOGY MODE, FLIGHT SYMBOLOGY MODE, VIDEO ON, VIDEO OFF, and DESIGNATE POSITION AS SYMBOL.

Priority 3 control functions are functions that may be used frequently and may include: CLUTTER, DECLUTTER, SLAVE SENSOR TO HELMET, LOCK SENSOR, SYMBOL IS TARGET, SYMBOL IS WAYPOINT, SYMBOL IS FRIENDLY, SYMBOL IS UNKNOWN, SYMBOL IS POINT OF INTEREST, SLEW DESIGNATED SYMBOL LEFT, SLEW DESIGNATED SYMBOL RIGHT, SLEW DESIGNATED SYMBOL UP, and SLEW DESIGNATED SYMBOL DOWN.

Priority 4 control functions are functions that may be used only two to five times per flight and may include: VIDEO 1 SELECT and VIDEO 2 SELECT.

Priority 5 control functions are functions that may be used only one or two times per flight and may include: GO TO BORESIGHT SYMBOLOGY MODE, FINE BORESIGHT ADJUST UP, FINE BORESIGHT ADJUST DOWN, FINE BORESIGHT ADJUST LEFT, FINE BORESIGHT ADJUST RIGHT, FINE BORESIGHT ADJUST ROTATE RIGHT, FINE BORESIGHT ADJUST ROTATE LEFT, FINE BORESIGHT ADJUST HELMET REFERENCED SYMBOLOGY ADJUST ROTATE RIGHT, and FINE BORESIGHT ADJUST HELMET REFERENCED SYMBOLOGY ADJUST ROTATE LEFT.

Priority 6 control functions are functions that are used once every few flights and may include: INITIATE BUILT-IN-TEST.

Figure 8:
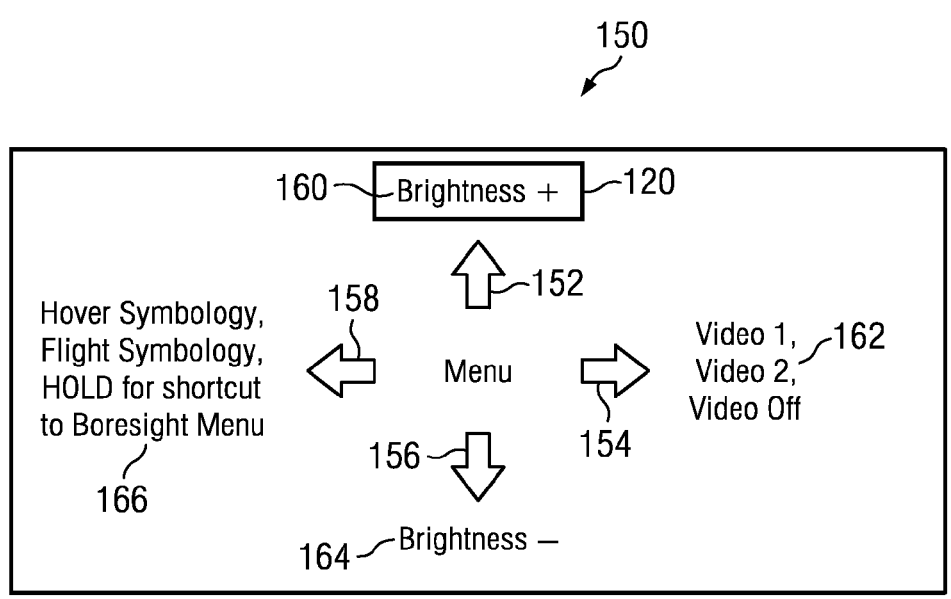
FIGS. 8-10 are user interface images according to embodiments of the present disclosure.

As shown in FIG. 8, an alternative user interface image 150 includes arrow icons 152-158 which point to control selection menu items 160-166. As described above for image 122, the user interface image 150 is displayed on the display device 106 and remains fixed relative to the scene of the environment as the user's helmet is moved. For example, to increase the brightness of the indicator 120 or of other graphics or text displayed on the display device 106, the user's head is directed toward control selection item 160. In this embodiment the indicator 120 is shown as a selection box. With the indicator 120 positioned on item 160 in response to the direction of the user's head, the user initiates a selection command to increase the brightness of the display. Alternatively, the "up arrow" key on the control column may be pressed by the user to increase the brightness of the display.

Figure 9:
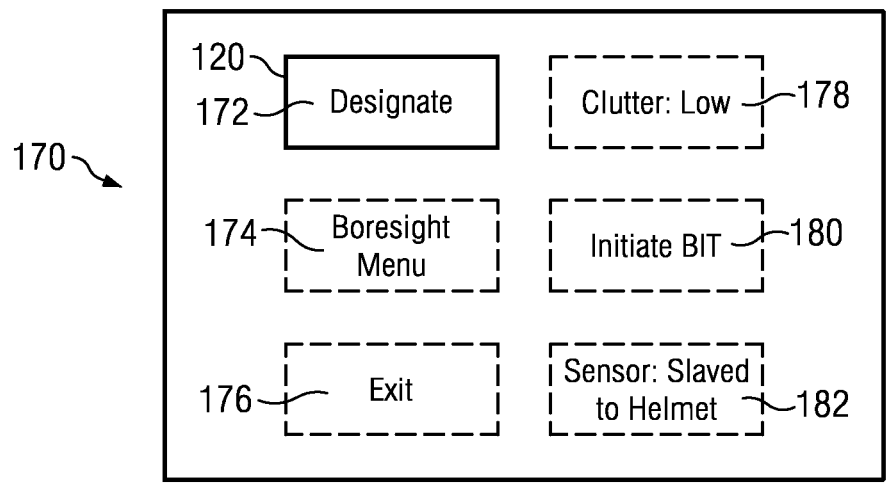

FIG. 9 depicts still another alternative user interface image 170 which is a main menu screen with menu items 172-182. As described above for user interface image 122, the user interface image 170 is displayed on the display device 106 and remains fixed relative to the scene of the environment as the user's helmet is moved. For example, to enter a submenu for the Designate 172 function, the user's head is turned toward the menu item 172. In this embodiment, the indicator 120 is shown as a selection box. With the indicator 120 positioned on item 172 in response to the direction of the user's head, the user initiates a selection command to enter the Designate submenu. Alternatively, the directional arrow keys on the control column may be used to slew the location of the selection box.

Figure 10:
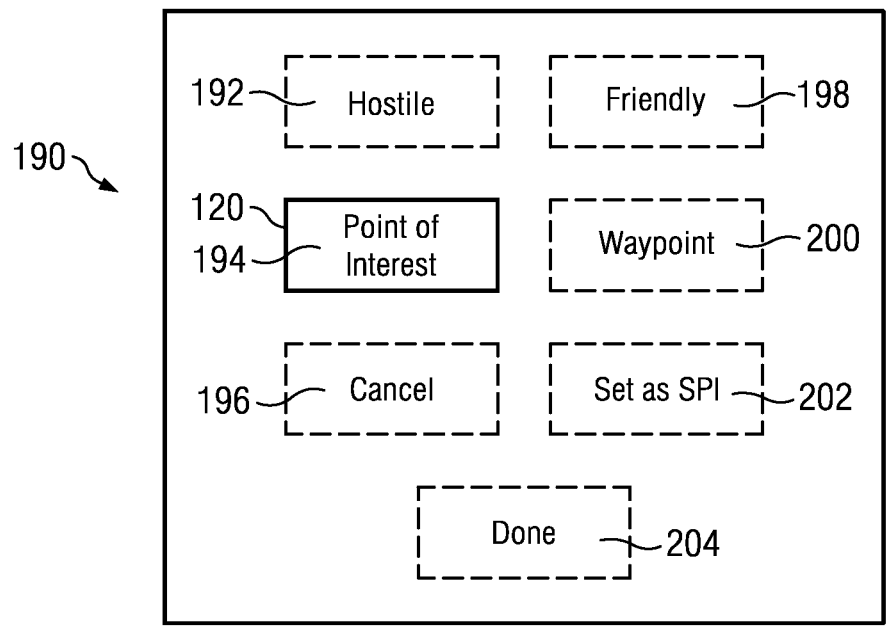

FIG. 10 depicts still another alternative user interface image 190 which is the Designate submenu entered when the Designate 172 function is selected from the main menu 170. The Designate submenu includes menu items 192-204. As described above for user interface image 122, the user interface image 190 is displayed on the display device 106 and remains stationary relative to the scene of the environment as the user's helmet is moved. For example, to label a point of interest in the scene, the user's head is directed toward the menu item 194. In this embodiment, the indicator 120 is shown as a selection box. With the indicator 120 positioned on item 194 in response to the direction of the user's head, the user initiates a selection command to label a point of interest. Alternatively, the directional arrow keys on the control column may be used to slew the selection box.

Figure 11:
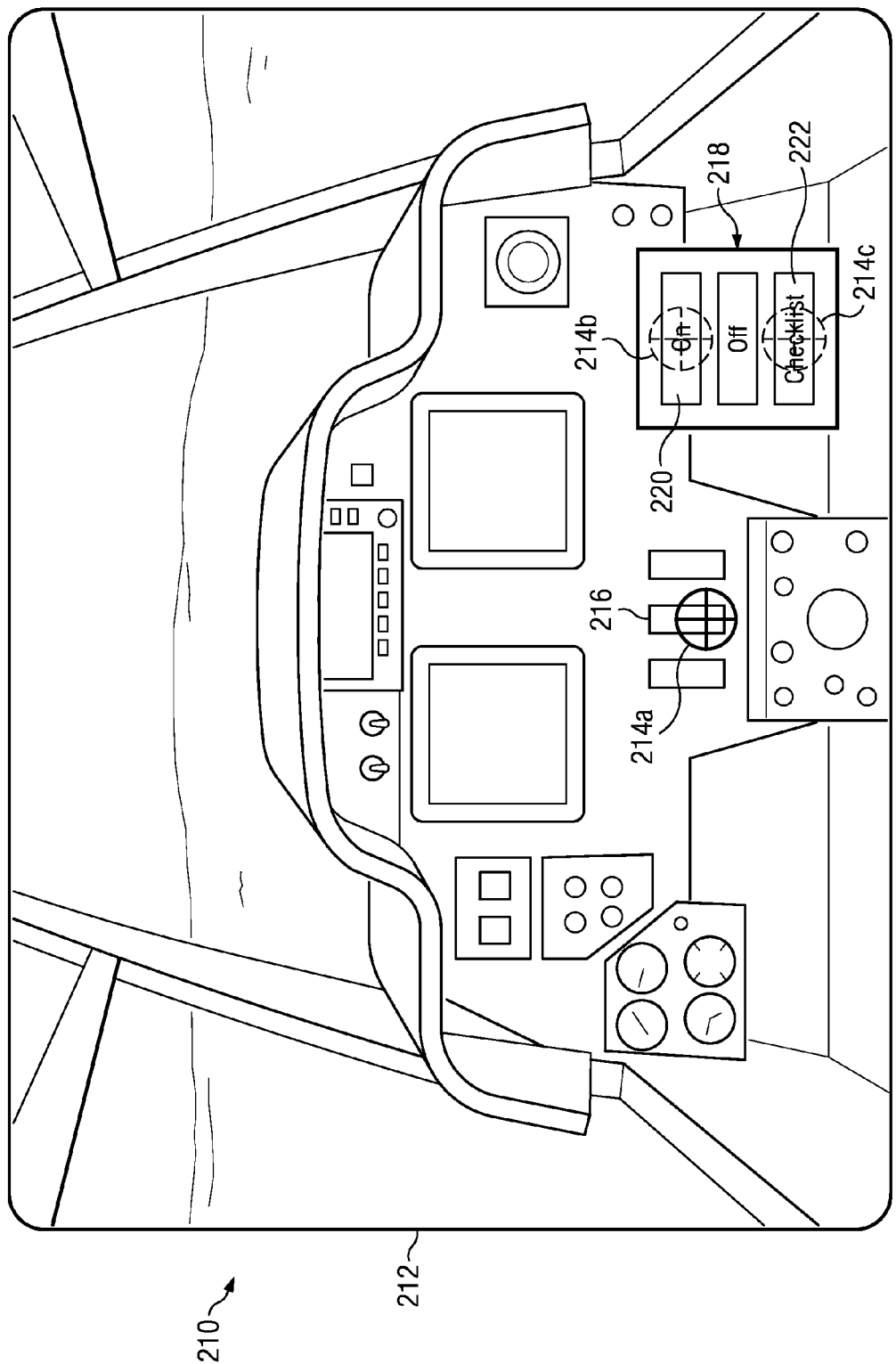
FIG. 11 is a view of a control panel of a vehicle as viewed through an HMD.

FIG. 11 depicts a scene 210 of a cockpit of a user's aircraft visible through a display device 212 which may be substantially similar to display device 106. An indicator 214a/214b/214c is movable relative to the scene 210 based upon the movement of the user's helmet. In this embodiment, the user may point to an instrument 216 in the cockpit, such as the landing gear switch. With the indicator 214a trained on the landing gear switch 216, a user interface image in the form of a context menu 218 may appear. In some embodiments, the context menu 218 may appear without further action when the indicator 214 is over the switch 216, but in other embodiments, the user may position the indicator and then select the switch using any of the selecting methods previously described. The context menu 218 includes menu items 220 and 222. As described above for user interface image 122, the user interface image 218 is displayed on the display device 106 and remains stationary relative to the scene of the cockpit as the user's helmet is moved. For example, to deploy the landing gear, the user's head and the indicator 214b are directed toward the menu item 220. With the indicator 214b positioned on item 220, the user initiates a selection command to deploy the landing gear. In another example, the user can view the status of a landing checklist by positioning the indicator 214c on menu item 222. With the indicator 214c positioned on the menu item 222, the landing checklist may appear on the display device for viewing by the user. Alternatively, with the indicator 214c positioned on the menu item 222, the user may initiate a selection command to view the landing checklist.

In an alternative embodiment, status or other equipment related information may be displayed without positioning a cross-hairs on equipment within the cockpit. Rather, the position of the user's helmet relative to an instrument or other item of equipment may, without further selection or initiation by the user, cause information to become displayed to the user. For example, when the user's helmet is positioned such that the user would be viewing the fuel gauge in a cockpit, other more detailed information about fuel status may be displayed on a user interface image. This image may appear to the user on the display device, without further selection or initiation by the user. In other words, the position of the user's helmet provides the selection action needed to initiate the display of the user interface image. In another alternative embodiment, a user interface image with predetermined menu or other information items may be displayed whenever the user's helmet is positioned such that the user's view is directed toward an non-instrumented portion of the cockpit, such as an overhead ceiling space or a bulkhead. When the user's view is directed toward one of these unused portions of the cockpit, menus or other information may be displayed for user reference or to initiate selection and activity.

Although specific examples have been provided above, it is understood that the HMD systems of this disclosure may be used in other applications. Generally, the crosshairs of the HMD system may be used to select and initiate the viewing of main menus, context menus, status reports, operational information and other information associated with equipment in the user's environment. In other embodiments, as described, information may be displayed based upon the position of the user's helmet, without further selection or initiation by the user. In medical applications, for example, the HMD system could be used by a quadriplegic patient to control instruments on a control panel, while the patient is stationary or in a moving vehicle, by directing the patient's head at the control instrument. In gaming applications, for example, the HMD system could be used by a stationary or moving player to gain information or control equipment using the position of the user's helmet.

The foregoing outlines features of selected embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure, as defined by the claims that follow.

What is claimed is:

1. A display system for use within an aircraft having a cockpit, the display system comprising:
   a mounting platform wearable by a user;
   a tracking system to track the position and movement of the user's head relative to a plurality of flight instruments within the cockpit;
   a processor, coupled to the tracking system, to determine a target flight instrument from the plurality of flight instruments and to generate a user interface image, wherein the target flight instrument is determined based upon the relative position of the user's head to the cockpit, wherein the user interface image comprises at least one user interface element associated with an action of the target flight instrument;
   a transparent display device, mounted to the mounting platform, through which the cockpit is visible and on which the user interface image is displayable, wherein the user interface image, when displayed, remains fixed relative to the cockpit as the user's head moves; and
   a target system comprising an indicator visible to the user, wherein the indicator is movable relative the user interface image, the target system to determine the at least one user interface element is generally aligned with the indicator, the target system to execute the action associated with the target flight instrument in response to a selecting act taken by the user.

2. The display system of claim 1 wherein the mounting platform comprises a helmet.

3. The display system of claim 1 wherein the user interface image includes a plurality of menu items.

4. The display system of claim 3 wherein the indicator is movable from a location over a first of the plurality of menu items to a location over a second of the plurality of menu items in response to movement of the user's head.

5. The display system of claim 1 wherein the indicator is a set of cross-hairs.

6. The display system of claim 1 wherein the selecting act is pressing a button on a control column in an aircraft.

7. The display system of claim 1 wherein the selecting act comprises an oral command.

8. The display system of claim 1 wherein the selecting act comprises a movement of the user's body.

9. The display system of claim 1 wherein the indicator is adapted for display on the transparent display device.

10. The display system of claim 1 wherein the action is associated with a menu selection on a control menu.

11. The display system of claim 1 wherein the action is displaying a submenu.

12. The display system of claim 1 wherein the action is displaying a context menu.

13. A method of operating a display system within a vehicle, the method comprising:
tracking the position and movement of a user's head relative to a plurality of vehicle instruments within the vehicle's interior;
determining a target instrument from the plurality of vehicle instruments based upon the relative position of the user's head to the vehicle's interior;
generating a user interface image corresponding to the target instrument, the user interface image comprising at least one user interface element associated with an action of the target instrument;
displaying the user interface image on a transparent display device mountable to the user's head, wherein the vehicle's interior is visible through the transparent display device, wherein the user interface image remains fixed relative to the vehicle's interior as the user's head moves;
determining that a user-visible indicator is generally aligned with the at least one user interface element, wherein the indicator is movable relative to the user interface image;
receiving a selecting act taken by the user; and
executing the action associated with the target instrument in response to the selecting act.

14. The method of claim 13 wherein the selecting act is pressing a button on a control column in an aircraft.

15. The method of claim 13 wherein the selecting act is an oral command.

16. The method of claim 13 wherein the selecting act is a movement of the user's body.

17. The method of claim 13 wherein the action is associated with a menu selection on a control menu.

18. The method of claim 13 wherein the action is displaying a submenu.

19. The method of claim 13 wherein the action is displaying a context menu.

20. The method of claim 13 wherein the vehicle is an aircraft.

21. The method of claim 13 wherein the transparent display device is connected to a helmet.

22. The method of claim 13 wherein the user interface image includes a plurality of menu items.

23. A display system for use within a vehicle, the display system comprising:
a mounting platform wearable by a user;
a tracking system to track the position and movement of the user's head relative to a plurality of vehicle instruments within the vehicle's interior;
a processor, coupled to the tracking system, to determine a target instrument from the plurality of vehicle instruments and to generate a user interface image, wherein the target instrument is determined based upon the relative position of the user's head to the vehicle's interior, wherein the user interface image comprises at least one user interface element associated with an action of the target instrument;
a transparent display device, mounted to the mounting platform, through which the vehicle's interior is visible and on which the user interface image is displayable, wherein the user interface image, when displayed, remains fixed relative to the vehicle's interior as the user's head moves; and
a target system comprising an indicator visible to the user, wherein the indicator is movable relative the user interface image, the target system to determine the at least one user interface element is generally aligned with the indicator, the target system to execute the action associated with the target instrument in response to a selecting act taken by the user.

24. The display system of claim 23 wherein the user interface image includes a plurality of menu items.

25. The display system of claim 24 wherein the indicator is movable from a location over a first of the plurality of menu items to a location over a second of the plurality of menu items in response to movement of the user's head.

26. A method of operating a display system within an aircraft having a cockpit, the method comprising:
tracking the position and movement of a user's head relative to a plurality of flight instruments within the cockpit;
determining a target instrument from the plurality of flight instruments based upon the relative position of the user's head to the cockpit;
generating a user interface image corresponding to the target instrument, the user interface image comprising at least one user interface element associated with an action of the target instrument;
displaying the user interface image on a transparent display device mountable to the user's head, wherein the cockpit is visible through the transparent display device, wherein the user interface image remains fixed relative to the cockpit as the user's head moves;
determining that a user-visible indicator is generally aligned with the at least one user interface element, wherein the indicator is movable relative to the user interface image;
receiving a selecting act taken by the user; and
executing the action associated with the target instrument in response to the selecting act.

* * * * *